US009798114B2

(12) United States Patent
Nabighian et al.

(10) Patent No.: US 9,798,114 B2
(45) Date of Patent: Oct. 24, 2017

(54) CONCAVE SPACER-WAFER APERTURES AND WAFER-LEVEL OPTICAL ELEMENTS FORMED THEREIN

(71) Applicant: OmniVision Technologies, Inc., Santa Clara, CA (US)

(72) Inventors: Edward Nabighian, San Jose, CA (US); Alan Martin, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/307,255

(22) Filed: Jun. 17, 2014

(65) Prior Publication Data

US 2015/0362705 A1    Dec. 17, 2015

(51) Int. Cl.

| | |
|---|---|
| *G02B 11/00* | (2006.01) |
| *G02B 13/00* | (2006.01) |
| *G02B 15/00* | (2006.01) |
| *G02B 25/00* | (2006.01) |
| *G02B 3/00* | (2006.01) |
| *G02B 7/00* | (2006.01) |

(Continued)

(52) U.S. Cl.
CPC ......... *G02B 13/0085* (2013.01); *G02B 7/022* (2013.01); *B29C 33/0055* (2013.01); *B29L 2011/0016* (2013.01)

(58) Field of Classification Search
CPC .............. B26F 1/38; B29D 11/00298; H04N 2005/2255; H04N 5/2251; H04N 5/2257; Y10T 83/04; G02B 13/0085; G02B 7/022; B29L 2011/0016; B29C 33/0055
See application file for complete search history.

(56) References Cited

U.S. PATENT DOCUMENTS

| 4,154,506 A | 5/1979 | Yevick |
|---|---|---|
| 8,000,041 B1 | 8/2011 | Lin et al. |

(Continued)

FOREIGN PATENT DOCUMENTS

TW    201239410 A    10/2012

OTHER PUBLICATIONS

Translation of the First Office Action corresponding to Taiwanese Patent Application No. 104116297, dated Aug. 3, 2016, 3 pages.

*Primary Examiner* — Alicia M Harrington
(74) *Attorney, Agent, or Firm* — Lathrop Gage LLP

(57) ABSTRACT

Wafer-level optical elements and the concave spacer-wafer apertures in which they are formed are disclosed. The wafer-level optical elements include a spacer wafer comprising a plurality of apertures. Each aperture has a concave shape in a planar cross-section of the spacer wafer and an overflow region intersecting the planar cross-section. The wafer-level optical elements also include an array of optical elements, each optical element of the array being formed of cured flowable material within a respective one of the plurality of apertures. A portion of the cured flowable material forming each optical element extends into the overflow region of the respective aperture of the plurality of apertures. The spacer wafer includes a plurality of apertures, each of the plurality of apertures having a concave shape in a planar cross-section of the spacer wafer. Each of the plurality of apertures includes an overflow region intersecting the planar cross-section.

9 Claims, 21 Drawing Sheets

(51) Int. Cl.
  *G02B 9/00* (2006.01)
  *G02B 7/02* (2006.01)
  *B29C 33/00* (2006.01)
  *B29L 11/00* (2006.01)

(56) References Cited

U.S. PATENT DOCUMENTS

| | | |
|---|---|---|
| 8,475,061 B2 | 7/2013 | Linnen et al. |
| 8,638,500 B2 | 1/2014 | Gallagher et al. |
| 8,643,953 B2 | 2/2014 | Rossi et al. |
| 2011/0134555 A1* | 6/2011 | Linnen ................ G02B 3/0018 359/894 |
| 2012/0026595 A1* | 2/2012 | Sasaki ................ G02B 3/0031 359/642 |
| 2012/0200943 A1* | 8/2012 | Gallagher ........ B29D 11/00307 359/737 |
| 2012/0242814 A1* | 9/2012 | Kubala .................... B26F 1/38 348/76 |
| 2013/0122261 A1 | 5/2013 | Barnes et al. |
| 2013/0271826 A1 | 10/2013 | Winmer |

\* cited by examiner

CONCAVE SPACER-WAFER APERTURES AND WAFER-LEVEL OPTICAL ELEMENTS FORMED THEREIN

BACKGROUND

In the manufacturing of wafer-level camera lenses, spacer wafers contain an array or pattern of spacer-wafer apertures. A liquid, such as a UV-curable polymer, is deposited into each aperture and is cast into an intermediate or final lens shape by a fabrication master, mold, or stamp. The casted polymer is then cured to form a solid lens.

In the casting step, excess polymer overflows from the spacer-wafer aperture, which can decrease production yields if not properly managed. One method of containing overflow material is to size the spacer-wafer aperture to span not only the lens diameter, but also a void region or overflow region between the fabrication master and the spacer wafer into which overflow material collects. Proper lens formation requires a minimum volume of material to be dispensed into the spacer-wafer aperture. Voids can ensure that the minimum volume is actually dispensed by containing excess dispensed material. However, by increasing the spacer-wafer aperture diameter, voids may limit the wafer die count—the number of die level cameras that can be manufactured per wafer assembly. Voids may also introduce stray light artifacts in the images the cameras form.

Precise control of polymer volume dispensed in each spacer-wafer aperture can also reduce yield loss caused by polymer overflow. However, the calibration and maintenance of such control adds to manufacturing costs.

In wafer-level optics manufacturing processes that employ suspended wafer-level optical elements, such as suspended lenses, high yield requires sufficient adhesion of each casted lens to its respective spacer-wafer aperture sidewall surface. A prior-art method to improve this surface adhesion includes applying a surface treatment to the spacer-wafer aperture sidewall.

SUMMARY OF THE INVENTION

According to one embodiment, wafer-level optical elements are provided. The wafer-level optical elements include a spacer wafer with a plurality of apertures. Each of the plurality of apertures has a concave shape in a planar cross-section of the spacer wafer. Each of the plurality of apertures includes an overflow region intersecting the planar cross-section. The wafer-level optical elements also include an array of optical elements, each optical element of the array being formed of cured flowable material within a respective one of the plurality of apertures. A portion of the cured flowable material forming each optical element extends into the overflow region of the respective aperture of the plurality of apertures.

According to another embodiment, a spacer wafer is provided. The spacer wafer includes a plurality of apertures. Each of the plurality of apertures has a concave shape in a planar cross-section of the spacer wafer. Each of the plurality of apertures includes an overflow region intersecting the planar cross-section.

DETAILED DESCRIPTION OF THE FIGURES

The present disclosure relates to wafer-level cameras, spacer wafers for wafer-level cameras, and lenses formed within spacer-wafer apertures, and more particularly, to spacer-wafer apertures for lens-in-a-pocket and suspended lens technologies. FIGS. 1-5 illustrate prior-art wafer-level optical element technologies.

Figure 1:
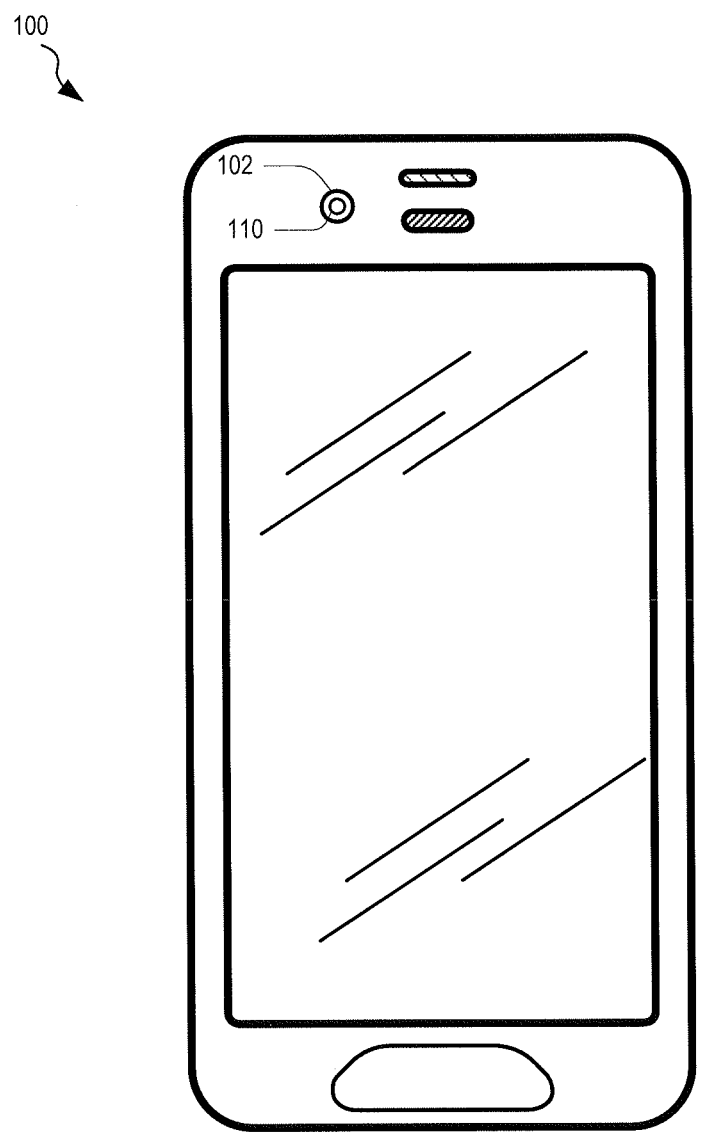
FIG. 1 shows a prior-art wafer-level optical element incorporated into a camera module of a mobile phone.
Figure 2:
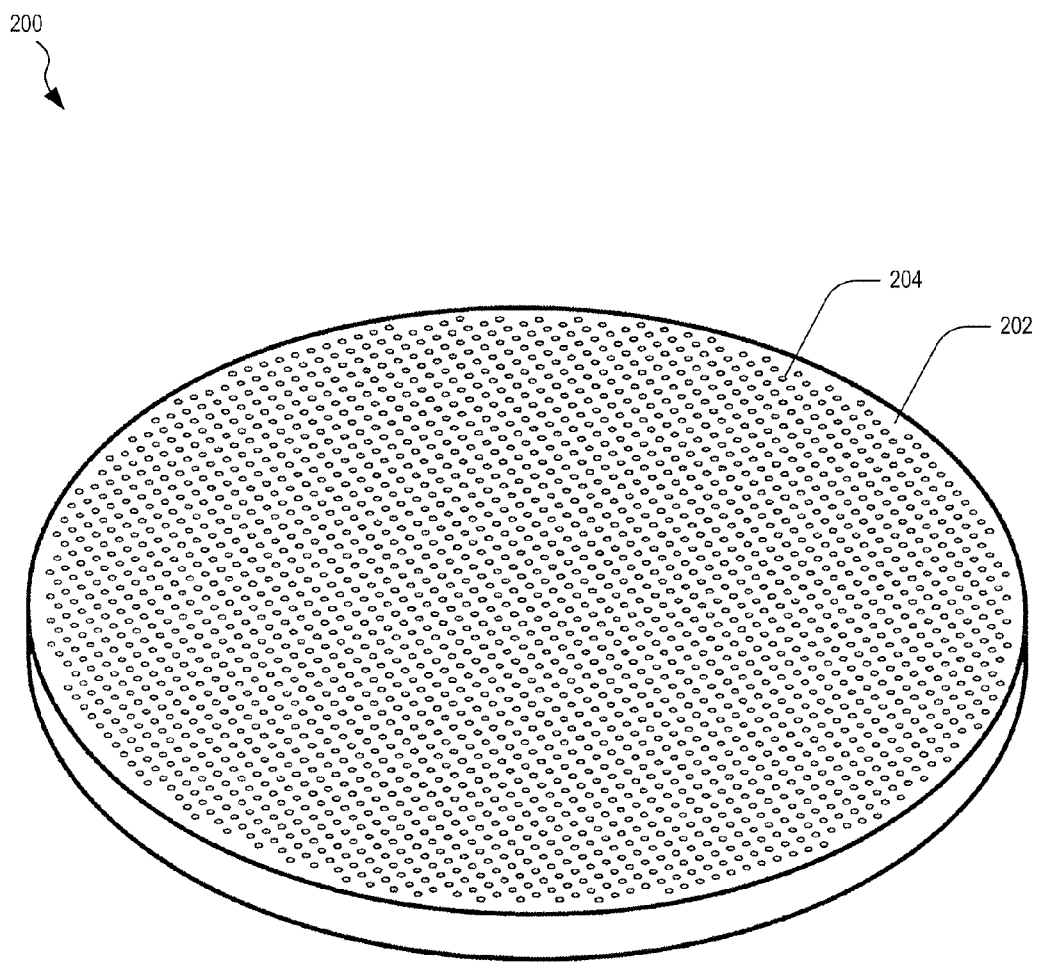
FIG. 2 shows a prior-art spacer wafer that includes a spacer region and an array of prior-art spacer-wafer apertures.

FIG. 1 shows a prior-art wafer-level optical element 110 incorporated into a camera module 102 of a mobile phone 100. The manufacturing process of wafer-level optical elements, such as wafer-level optical element 110, includes forming wafer-level optical elements in a spacer wafer. One example of such a prior-art spacer wafer is spacer wafer 200 of FIG. 2. Prior-art spacer wafer 200 includes a spacer region 202 and an array of spacer-wafer apertures 204. Each wafer-level optical element formed in spacer wafer 200 is formed in a different spacer-wafer aperture 204.

Figure 3:
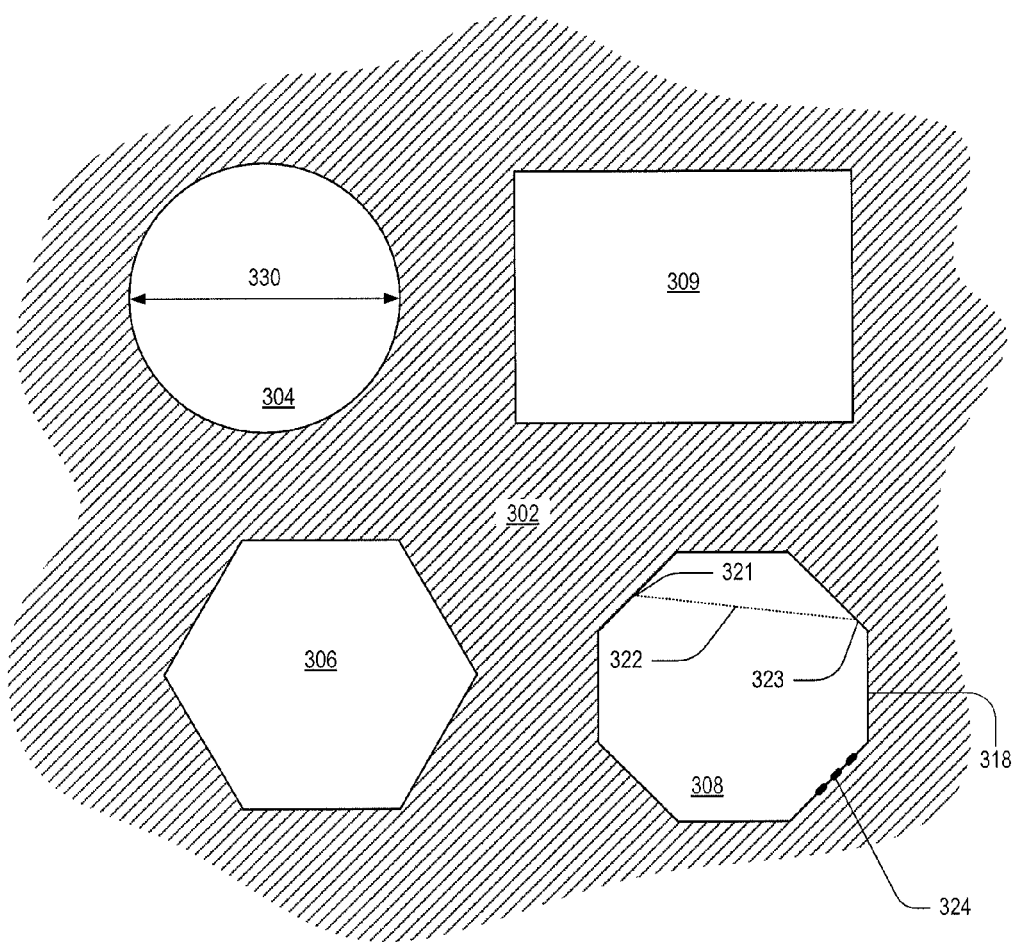
FIG. 3 is a plan view of prior-art spacer-wafer apertures.

FIG. 3 is a plan view of four exemplary prior-art spacer-wafer apertures 304, 306, 308, and 309. One or more spacer-wafer apertures 304, 306, 308, 309 may be incorporated into spacer wafer 200 as one or more apertures 204. Spacer-wafer apertures 304, 306, 308, and 309 are separated by a spacer region 302. Spacer region 302 is similar to spacer region 202. Spacer-wafer aperture 304 is a circular is shape, having a diameter 330.

Geometrically, if a line segment connecting any two different points on the shape's perimeter is inside the area enclosed by the shape or is on the shape perimeter itself, the shape is convex. This definition is consistent with what it means for an imaging lens to have a convex shape, however, the shape of a spacer-wafer aperture (convex, concave, etc.), does not refer to the type of lens (convex, concave, etc.) that may be formed within it Rather, a "convex spacer-wafer aperture" is a spacer-wafer aperture with a convex shape. As such, the respective shapes of prior-art spacer-wafer apertures 304, 306, 308, and 309 are convex.

For example, a line segment 322 connects two points 321 and 323 on perimeter 318 of octagonal spacer-wafer aperture 308 and traverses spacer-wafer aperture 308. A line segment 324 connects two points on the same side of octagonal spacer-wafer aperture 308, and hence is entirely on the perimeter of octagonal spacer-wafer aperture 308. Thus, octagonal spacer-wafer aperture 308 is convex. It can be readily understood that prior-art spacer-wafer aperture 304, 306, and 309 are also convex.

Figure 4:
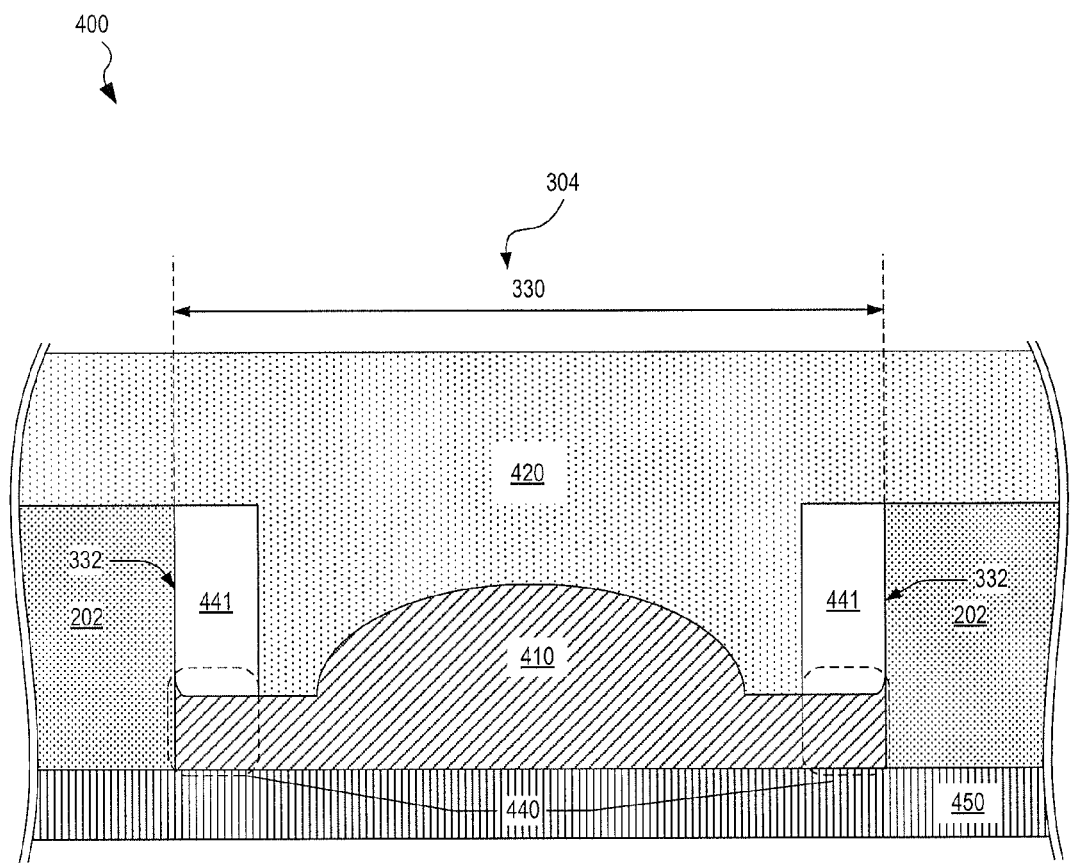
FIG. 4 is a cross-sectional view of a prior-art in-pocket wafer-level optical element formed within a prior-art convex spacer-wafer aperture.

FIG. 4 shows a cross-section 400 of a prior-art in-pocket wafer-level optical element 410 formed within a convex spacer-wafer aperture 304. A master 420 forms a wafer-level optical element 410 on a substrate 450. Wafer-level optical element 410 is bounded by spacer-wafer aperture sidewall 332. As shown, wafer-level optical element 410 is formed as a lens-in-pocket, wherein the "pocket" consists of spacer-wafer aperture sidewalls 332 and substrate 450. In this example of prior-art, the spacer-wafer aperture is circular spacer-wafer aperture 304 with diameter 330. Lens overflow 440 of wafer-level optical element 410 flows into void region 441.

Figure 5:
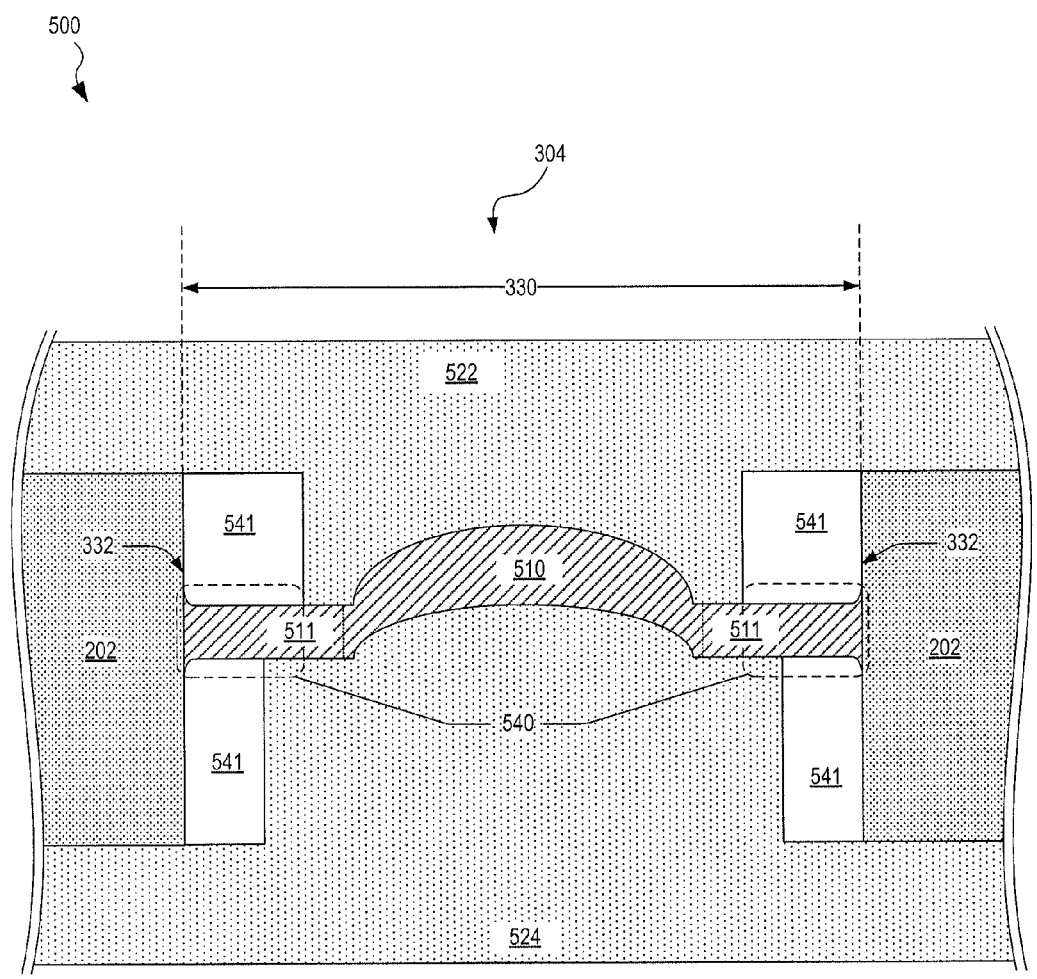
FIG. 5 is a cross-sectional view of a prior-art suspended wafer-level optical element formed within a convex spacer-wafer aperture.

FIG. 5 shows a cross-sectional view 500 of a prior-art suspended wafer-level optical element 510. Suspended wafer-level optical element 510 may be formed within convex spacer-wafer aperture 304, bounded by spacer-wafer aperture sidewall 332, and suspended by a membrane 511. In cross-sectional view 500, an upper master 522 and a lower master 524 are used to cast wafer-level optical element 510 within a bounded region defined by spacer-wafer aperture sidewall 332, upper master 522, and lower masters 524. Void region 541 serves as an overflow spaces in which portion 540 of membrane 511 may overflow during fabrication of suspended wafer-level optical element 510.

Figure 6:
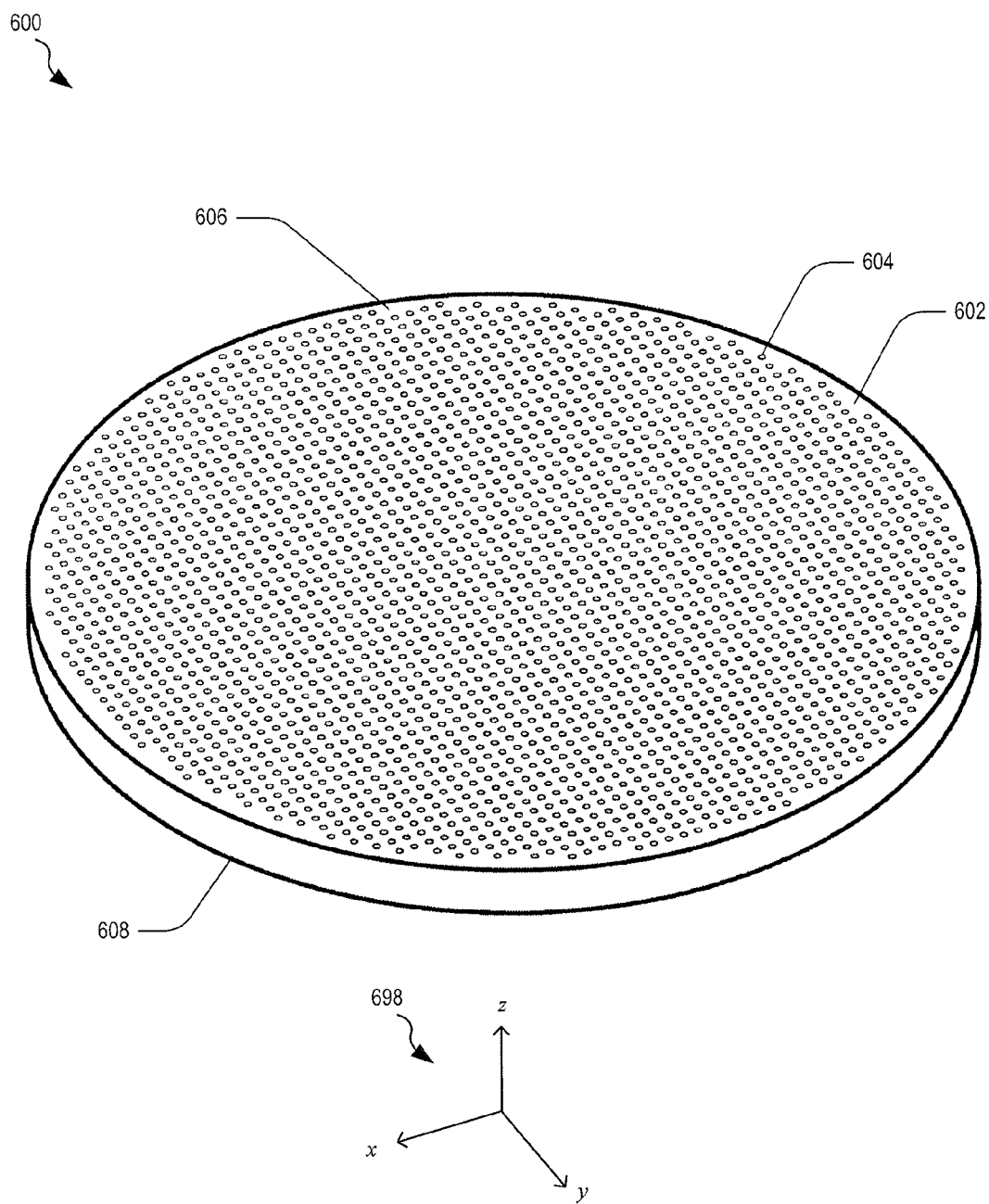
FIG. 6 shows a spacer wafer that includes an array of spacer-wafer apertures, of which at least one aperture is concave, in an embodiment.

Compared to the convex spacer-wafer apertures of prior art, the use of concave spacer-wafer apertures in spacer wafers has distinct advantages relating to die count and lens adhesion. FIG. 6 shows a spacer wafer 600 that includes a spacer region 602 and an array of spacer-wafer apertures 604, of which at least one spacer-wafer aperture is concave. In the embodiment of FIG. 6, top spacer wafer surface 606 and bottom spacer wafer surface 608 of spacer wafer 600 are in planes parallel to the x-y plane of coordinate axes 698. FIG. 6 may not be drawn to scale.

Spacer-wafer apertures 604 are arranged in a rectangular array on spacer wafer 600. Spacer-wafer apertures may be arranged differently on a spacer wafer without departing from the scope herein. For example, the spacer-wafer apertures may be arranged in a hexagonal array or a non-periodic array.

Figure 7:
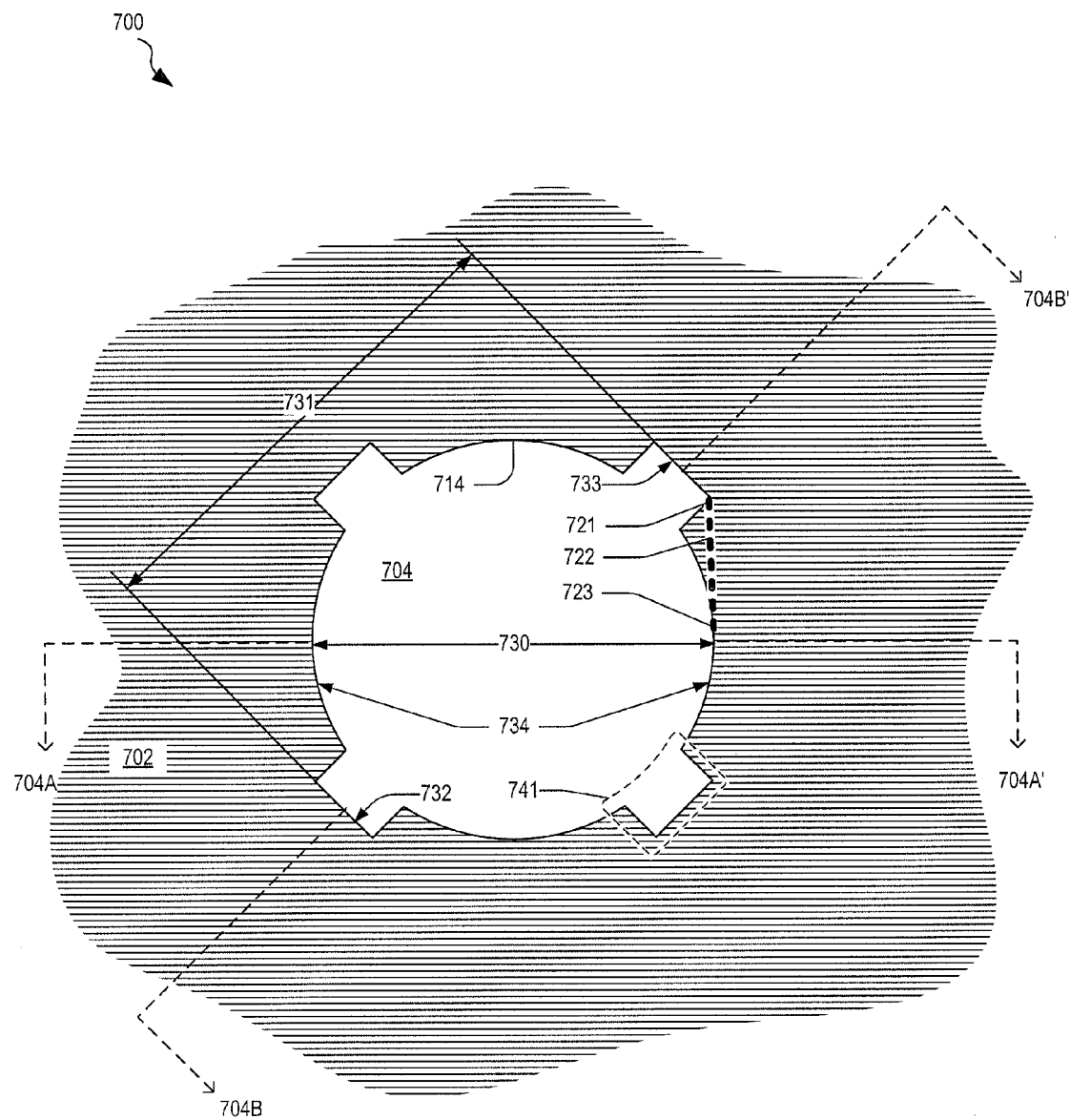
FIG. 7 is a plan view of a concave spacer-wafer aperture, in an embodiment.

FIG. 7 is a plan view of a concave spacer-wafer aperture 704 surrounded by a spacer region 702 in a spacer wafer portion 700. In one embodiment, concave spacer-wafer aperture 704 may be incorporated into spacer wafer 600 of FIG. 6 as one of spacer-wafer apertures 604.

The shape of concave spacer-wafer aperture 704 may be viewed as the union of two concentric shapes: a circle and a rotated plus sign (+). The circle has a diameter 730, which is the maximum distance between two curved aperture sidewalls 734. The plus sign is visible as four protrusions 741. The width of rotated plus sign is width 731 between parallel protrusion sidewalls 732 and 733.

A shape is concave if, for a line segment connecting any two different points on a shape's perimeter, part or all of the line segment is outside the area enclosed by the shape. Line segment 722 illustrates that spacer-wafer aperture 704 is concave. Line segment 722 connects two points 721 and 723 on perimeter 714 of concave spacer-wafer aperture 704 while not traversing spacer-wafer aperture 704 itself. Accordingly, a "concave spacer-wafer aperture" is a spacer-wafer aperture with concave shape.

Figure 21:
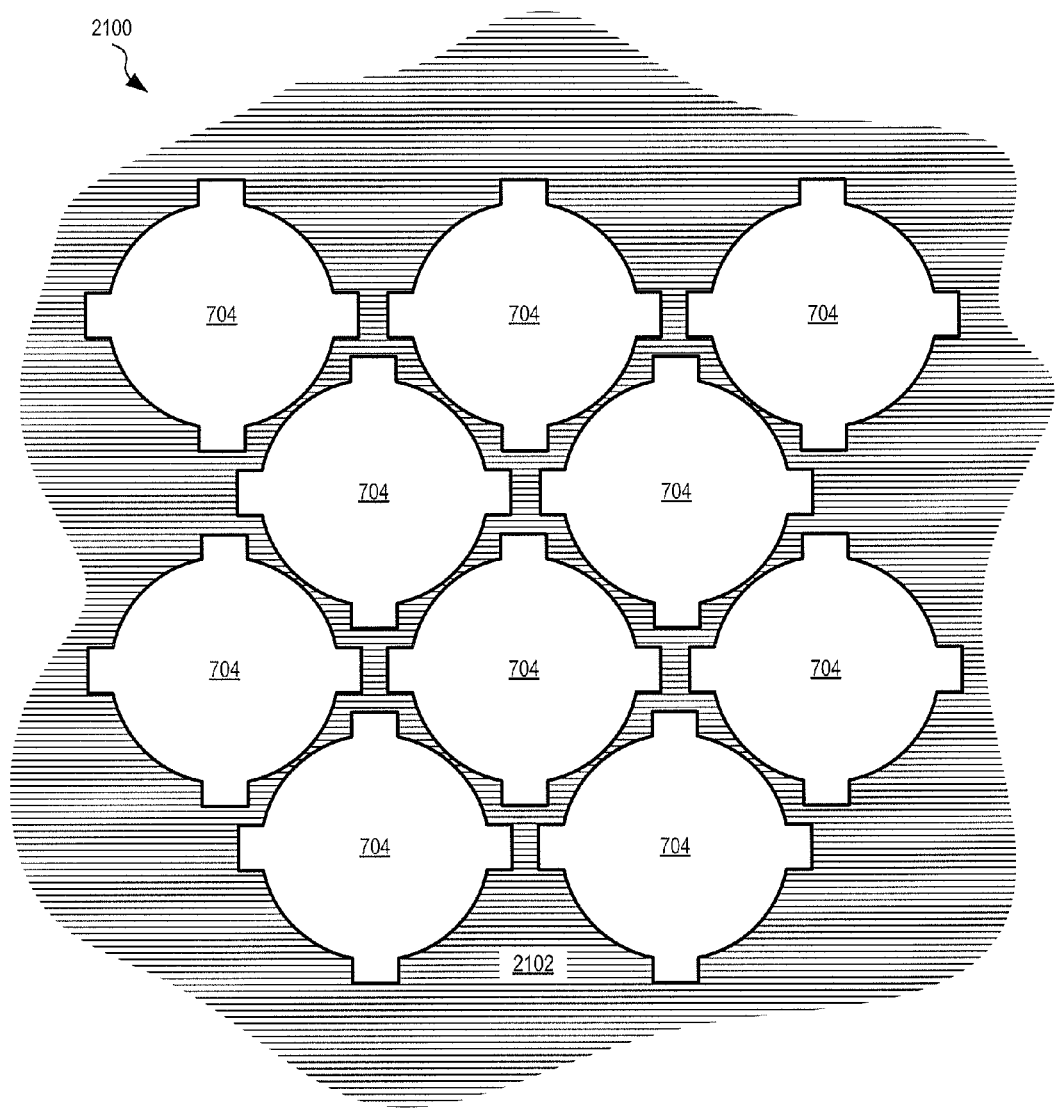
FIG. 21 shows a plurality of tightly packed concave spacer-wafer apertures of FIG. 7, formed in a spacer wafer, in an embodiment.

One benefit of a concave spacer-wafer aperture is an increase in the number of space-wafer apertures per wafer as compared to the prior art. FIG. 21 shows a plurality of tightly packed concave spacer-wafer apertures 704 on a spacer region 2102 of a spacer wafer 2100. FIG. 21 demonstrates that the size and shape of concave spacer-wafer apertures 704 allows for a greater number of concave spacer-wafer apertures 704 to be formed on spacer wafer 2100, and hence a higher die count as compared to the prior-art. In an embodiment, spacer region 2102 is a portion of spacer wafer 600, FIG. 6. This benefit is expanded on if FIG. 10, below.

FIGS. 8-12 illustrate how protrusions 741 of concave spacer-wafer aperture 704 replace the void regions of the prior art as overflow regions. In prior-art wafer-level optical elements, examples of such void regions include void regions 441, FIG. 4, and 541, FIG. 5.

Figure 8:
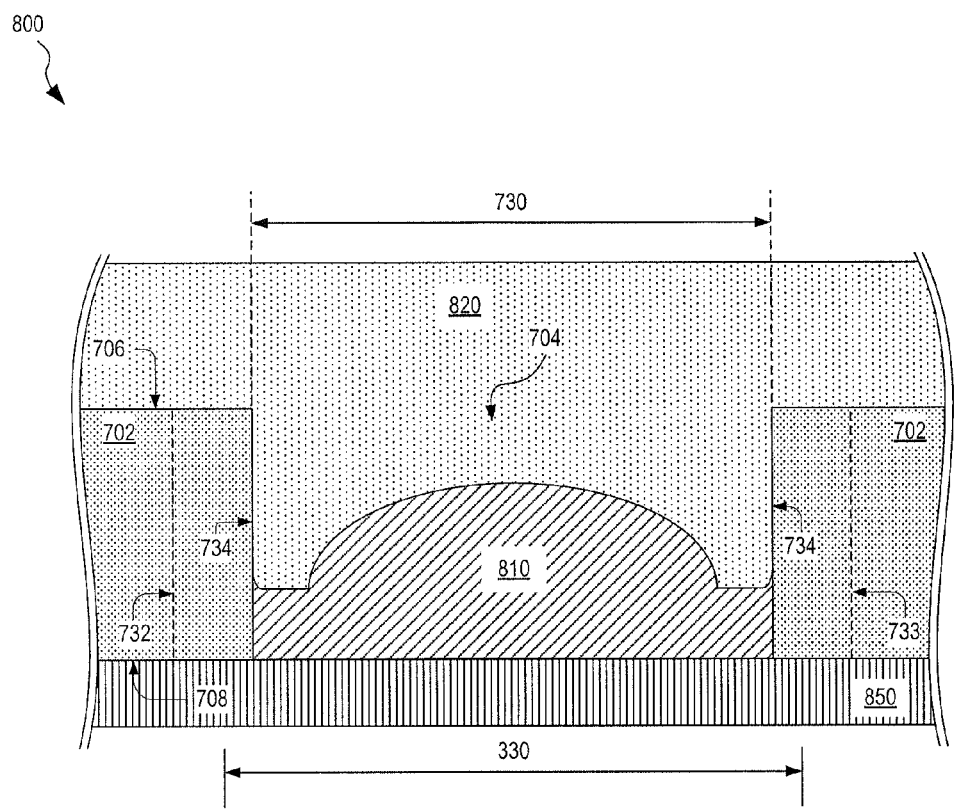
FIG. 8 is a first cross-sectional view of an in-pocket wafer-level optical element formed within the concave spacer-wafer aperture of FIG. 7, in an embodiment.

FIG. 8 shows a cross-sectional view 800 of an in-pocket wafer-level optical element 810 formed within concave spacer-wafer aperture 704. Cross-sectional view 800 corresponds to cross-section 704A-704A' of FIG. 7.

In cross-sectional view 800, a master 820 forms wafer-level optical element 810 onto a substrate 850. In cross-sectional view 800, wafer-level optical element 810 is bounded by curved aperture sidewalls 734. In an embodiment, master 820 and substrate 850 are identical to master 420 and substrate 450, FIG. 4, respectively. In such an embodiment, cross-sectional view 800 resembles prior-art cross-section 400, FIG. 4, except that void region 441 is absent. Consequently, the diameter 730 of spacer-wafer aperture 704 is smaller than the corresponding diameter 330 of FIG. 4. For comparison sake, diameter 330 is shown with diameter 730 in FIG. 8. The smaller aperture allows for a greater number of concave apertures to fit on spacer wafer 600, and hence a higher die count than prior-art spacer wafer 200. It will be understood that dimensions, diameters, and distances are not shown to scale.

Figure 9:
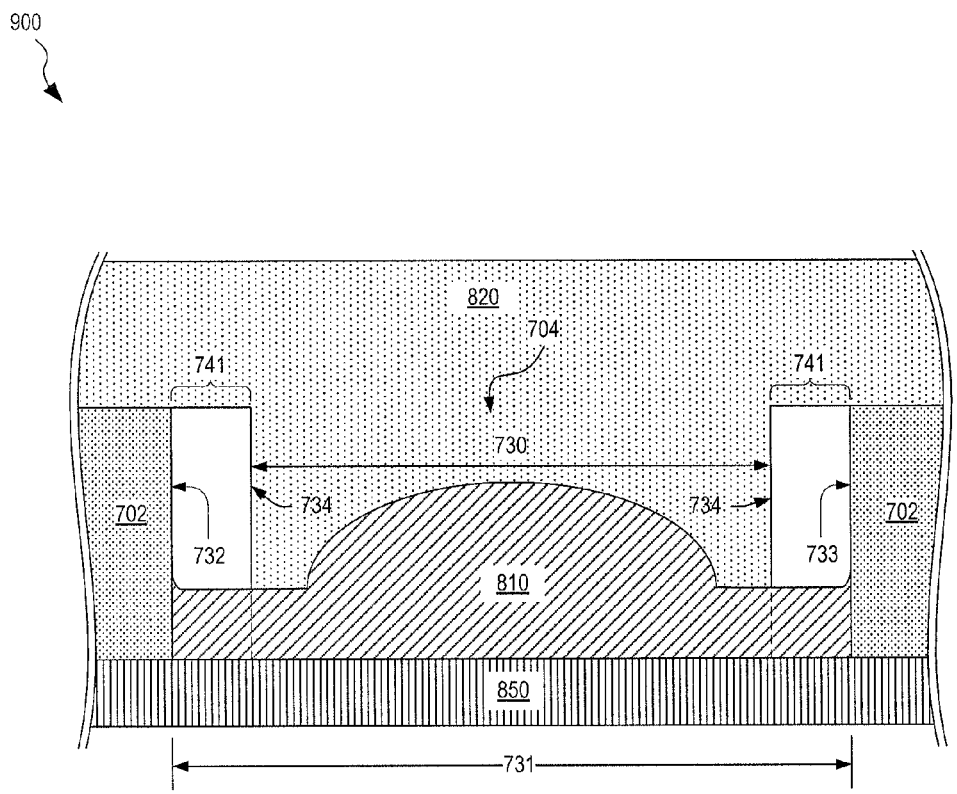
FIG. 9 is a second cross-sectional view of the in-pocket wafer-level optical element formed within the concave spacer-wafer aperture of FIG. 7, in an embodiment.

FIG. 9 shows a cross-sectional view 900 of an in-pocket wafer-level optical element 810 formed within concave spacer-wafer aperture 704. Cross-sectional view 900 corresponds to cross-section 704B-704B' of FIG. 7. In cross-section 704B-704B', wafer-level optical element 810 is bounded by parallel protrusion sidewalls 732 and 733. Dashed lines denote two curved aperture sidewalls 734. Protrusions 741 of spacer-wafer aperture 704 replace void region 441 as glue overflow areas.

Figure 10:
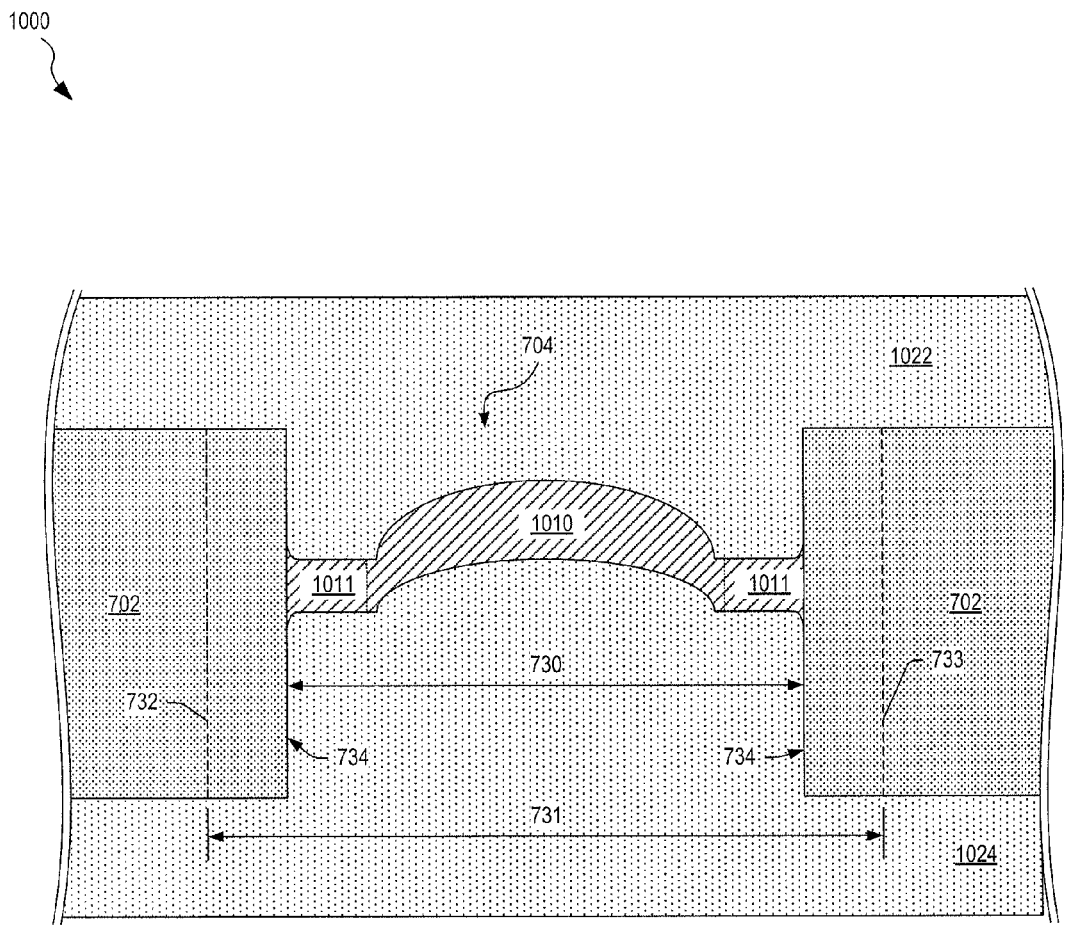
FIG. 10 is a first cross-sectional view of a suspended wafer-level optical element formed within a concave spacer-wafer aperture, and suspended by a membrane, in an embodiment.

FIG. 10 shows a cross-sectional view 1000 of a suspended wafer-level optical element 1010 formed within concave spacer-wafer aperture 704, and suspended by a membrane 1011. Cross-sectional view 1000 corresponds to cross-section 704A-704A' of FIG. 7. In cross-sectional view 1000, membrane 1011 adheres to curved sidewalls 734. Suspended wafer-level optical element 1010 is a meniscus suspended lens. Suspended wafer-level optical element 1010 may be of a different type, for example, plano-convex, biconvex, plano-concave, biconcave, without departing from the scope herein.

In an embodiment, masters 1022 and 1024 are similar to masters 522 and 524, of FIG. 5, respectively. In such an embodiment, cross-sectional view 1000 is similar to prior-art cross-sectional view 500, FIG. 5, with the exception that void region 541 is absent in the embodiment of FIG. 10. Consequently, diameter 730 of spacer-wafer aperture 704 is smaller than diameter 330 in FIG. 5. The smaller aperture allows for a greater number of concave apertures to fit on spacer wafer 600, and hence a higher die count than prior-art spacer wafer 200.

Figure 11:
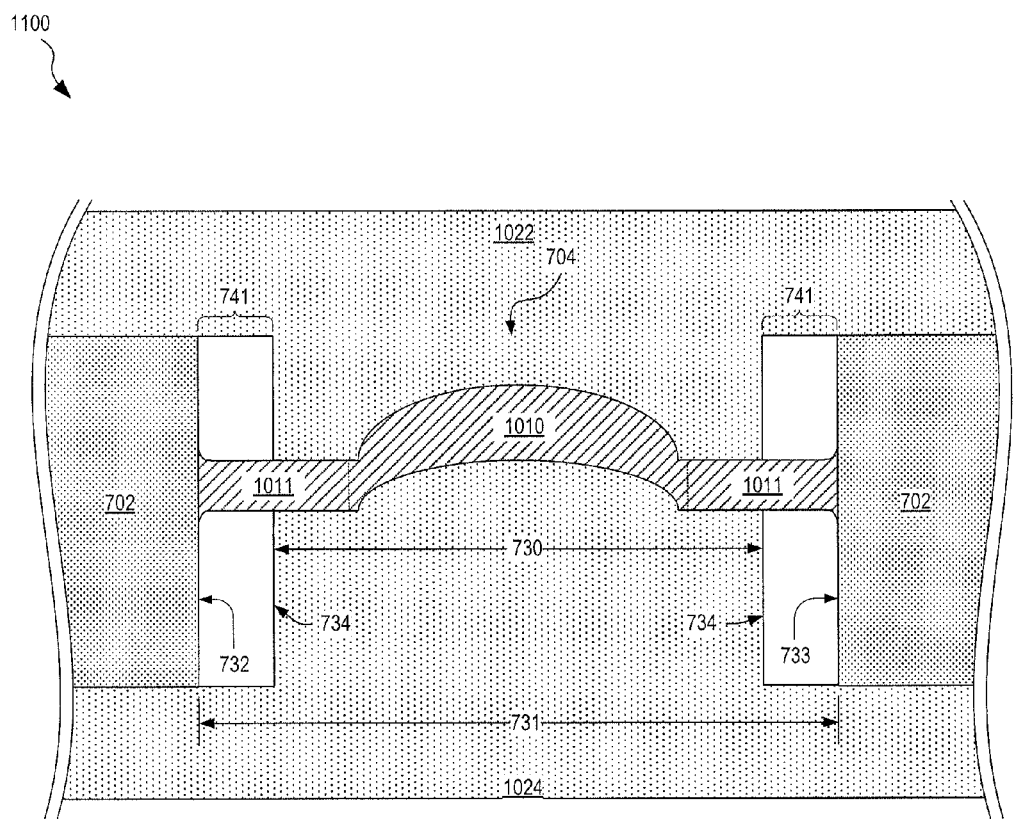
FIG. 11 is a second cross-sectional view of the suspended wafer-level optical element of FIG. 10, in an embodiment.

FIG. 11 shows a cross-sectional view 1100 of suspended wafer-level optical element 1010 formed within concave spacer-wafer aperture 704. Cross-sectional view 1100 corresponds to cross-section 704B-704B' of FIG. 7. In cross-sectional view 1100, membrane 1011 adheres to sidewalls 732 and 733 of parallel protrusions 741. Dashed lines denote two curved aperture sidewalls 734. Protrusions 741 of spacer-wafer aperture 704 replace void region 541 as lens overflow areas.

FIGS. 12-17 illustrate additional embodiments of concave spacer-wafer apertures 604 within spacer wafer 600.

Figure 12:
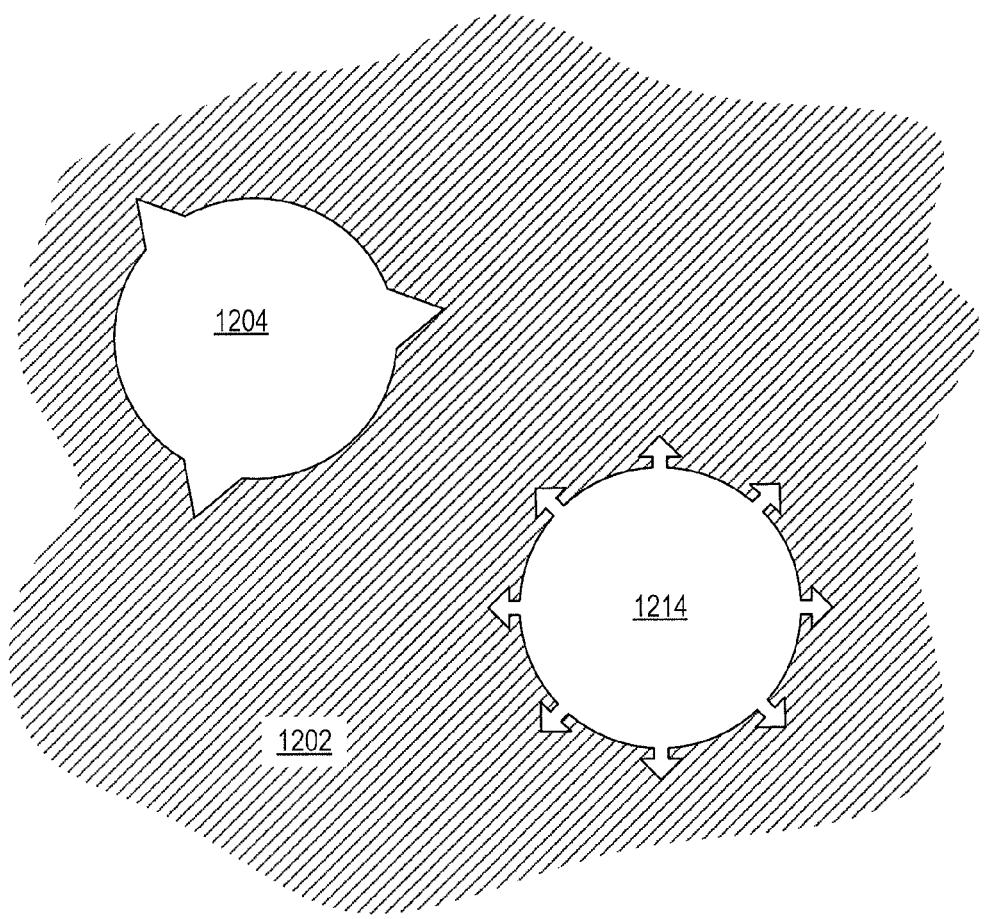
FIG. 12 is a plan view of concave spacer-wafer apertures in a portion of the spacer wafer of FIG. 6, in an embodiment.

FIG. 12 is a plan view of concave spacer-wafer apertures 1204 and 1214. In an embodiment, one or both of concave spacer-wafer apertures 1204 and 1214 are included in spacer wafer 600 as at least one of spacer-wafer apertures 604.

Like spacer-wafer aperture 704, the shapes of concave spacer-wafer apertures 1204 and 1214 each may be viewed as the union of a circle with one or more convex polygons, although any concave shape may be used without departing from the scope herein. The shape of concave spacer-wafer aperture 1204 may be viewed as the union of a circle with an equilateral triangle. The shape of concave spacer-wafer aperture 1214 may be viewed as the union of a circle with eight arrows, wherein each arrow consists of two convex polygons: a rectangle and a triangle. In an embodiment, the shape of a concave spacer aperture may be the union of an ellipse with one or more convex polygons. For example, the shape concave spacer aperture may be the union of an ellipse with a triangle.

Figure 13:
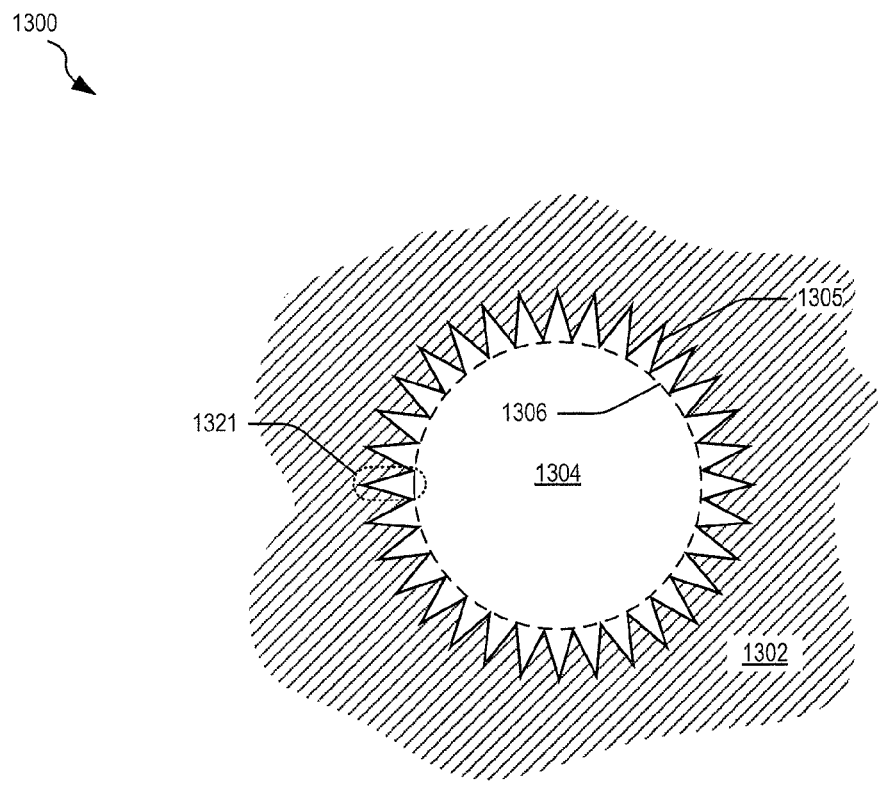
FIG. 13 is a plan view of a star-like concave spacer-wafer aperture in a portion of the spacer wafer of FIG. 6, in an embodiment.

FIG. 13 is a plan view of a star-like concave spacer-wafer aperture 1304 formed within a spacer wafer portion 1300. Surrounding star-like concave spacer-wafer aperture 1304 is a spacer region 1302.

In the present embodiment, spacer-wafer aperture 1304 is a concave polygon that may be viewed as the union of a 32-sided regular convex polygon (a "32-gon") with congruent isosceles triangular protrusions 1321 appended to each 32-gon side. It will be understood that spacer-wafer aperture 1304 may be formed with more or fewer sides without departing from the scope herein. In an embodiment, star-like concave spacer-wafer aperture 1304 is included in spacer wafer 600 as at least one of spacer-wafer apertures 604.

Figure 14:
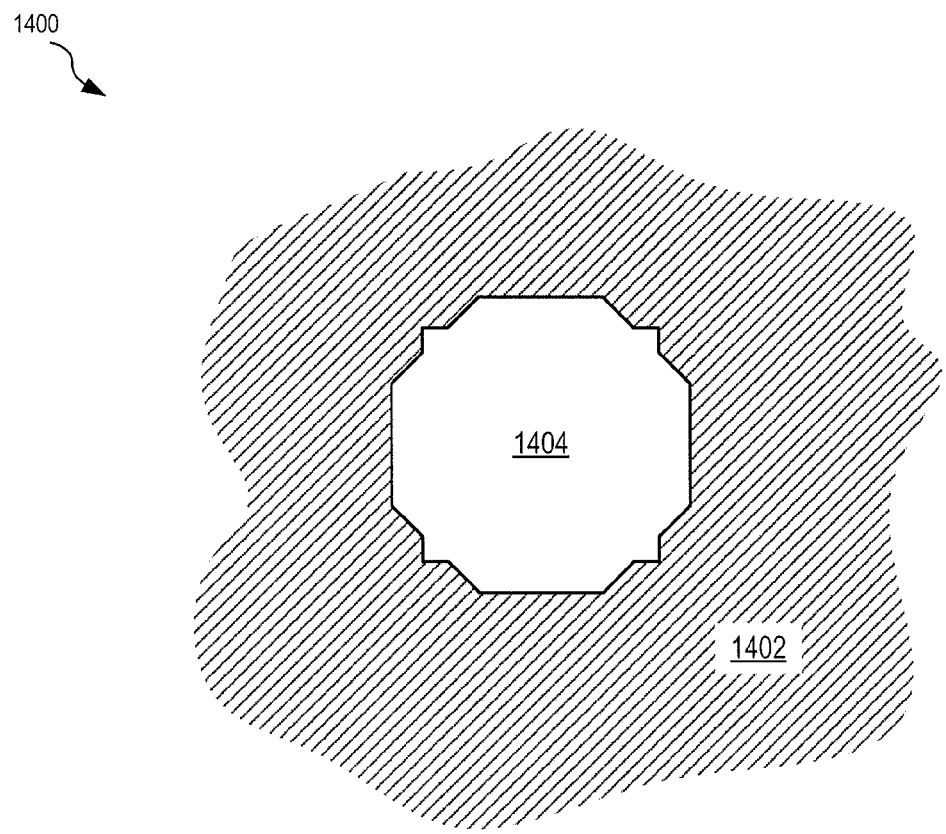
FIG. 14 is a plan view of a polygonal concave spacer-wafer aperture in a portion of the spacer wafer of FIG. 6, in an embodiment.

FIG. 14 is a plan view of a polygonal concave spacer-wafer aperture 1404 formed within a spacer wafer portion 1400. Surrounding polygonal concave spacer-wafer aperture 1404 is a spacer region 1402.

In the present embodiment, spacer-wafer aperture 1404 is formed as a concave polygon that may be viewed as the union of two concentric regular polygons: a square and an octagon. Spacer-wafer aperture 1404 may be formed as the union of more or fewer regular polygons without departing from the scope herein. In an embodiment, polygonal concave spacer-wafer aperture 1404 is included in spacer wafer 600 as at least one of spacer-wafer apertures 604.

Figure 15:
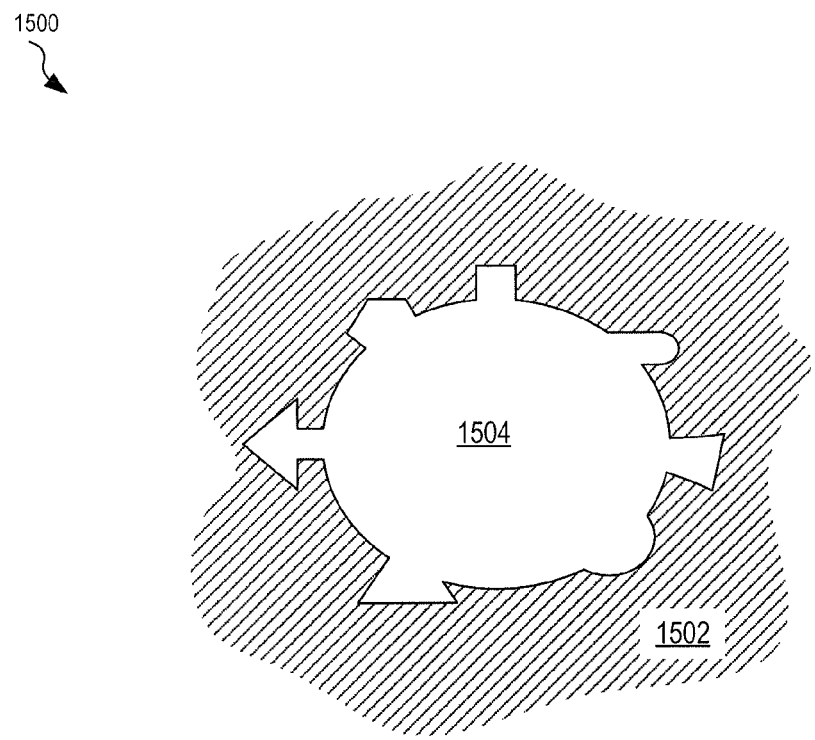
FIG. 15 is a plan view of a non-symmetric concave spacer-wafer aperture in a portion of the spacer wafer of FIG. 6, in an embodiment.

FIG. 15 is a plan view of a non-symmetric concave spacer-wafer aperture 1504 formed within a spacer wafer portion 1500. Surrounding non-symmetric concave spacer-wafer aperture 1504 is a spacer region 1502. Concave spacer-wafer aperture 1504 is an embodiment of at least one of spacer-wafer apertures 604.

It will be understood that concave spacer-wafer apertures may be formed with rotational symmetry, reflection symmetry, or no symmetry. By way of example, spacer-wafer apertures 704, 1204, 1214, 1304, and 1404 are formed with one or both of rotational and reflection symmetry, and spacer-wafer aperture 1504 is formed with neither rotational symmetry nor reflection symmetry. Concave spacer-wafer apertures may be formed with different symmetry properties without departing from the scope herein.

Figure 16A:
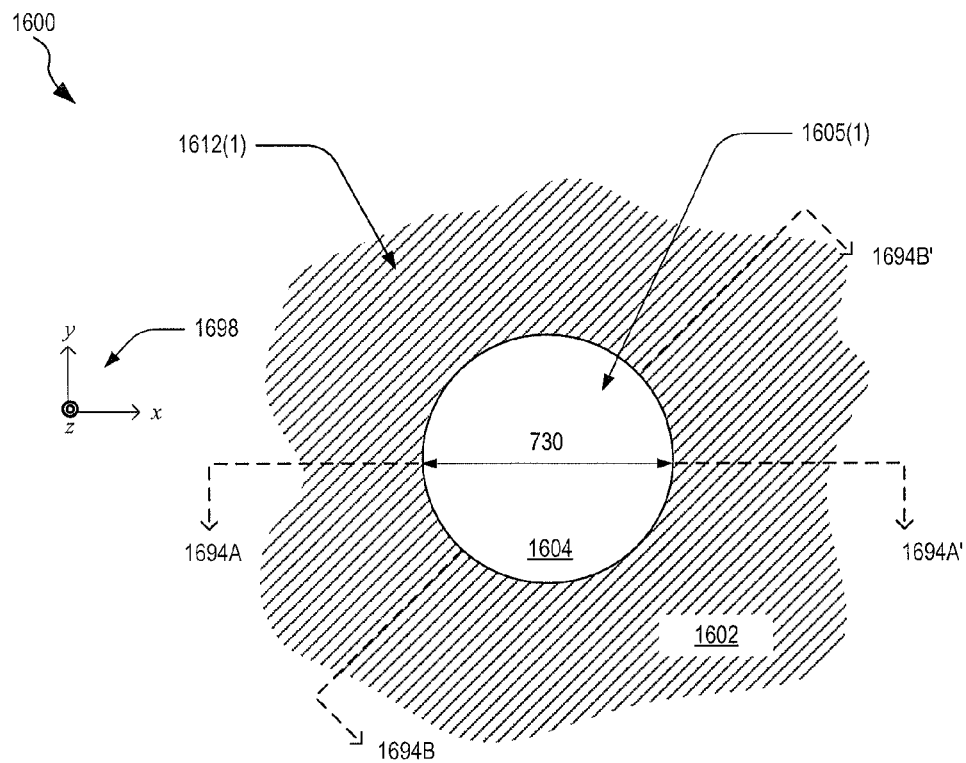
FIGS. 16A and 16B show top and bottom plan views, respectively, of a spacer wafer portion that includes a concave spacer-wafer aperture with a depth-dependent cross-section, in an embodiment.
Figure 16B:
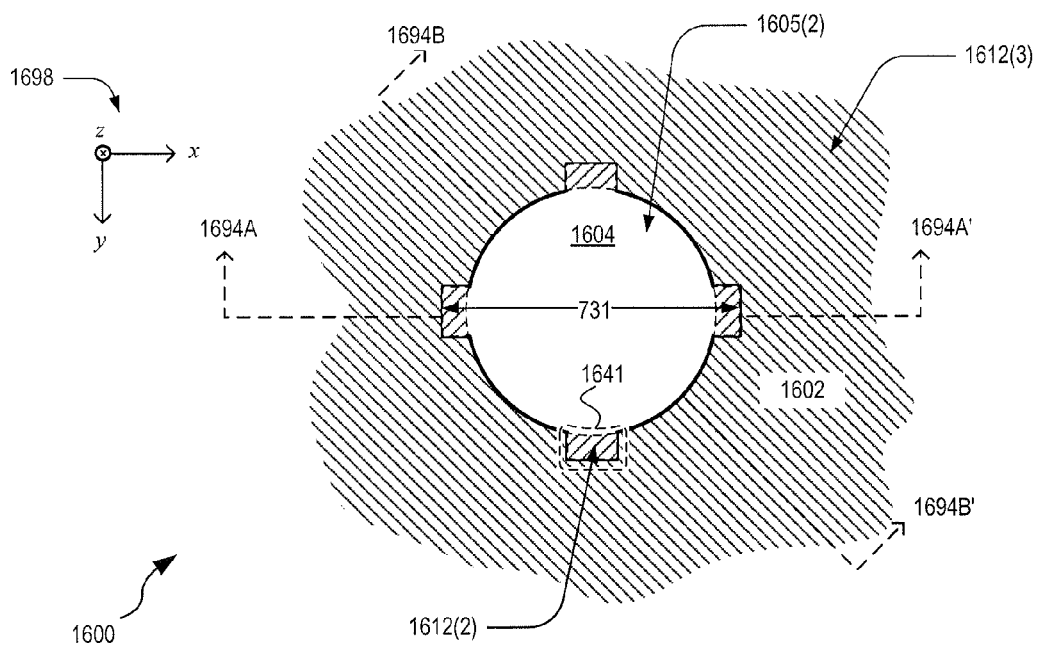

FIGS. 16A and 16B show a top plan view and a bottom plan view, respectively, of a spacer-wafer aperture 1604 in a spacer wafer portion 1600. Surrounding spacer-wafer aperture 1604 is a spacer region 1602. In an embodiment, spacer-wafer aperture 1604 is included in spacer wafer 600 as at least one of spacer-wafer apertures 604.

One or more cross-sectional view of spacer-wafer aperture 1604 (see FIGS. 17A and 17B) may be generated along the z-axis of xyz right-hand coordinate system 1698. In FIG. 16A, the z-axis is directed out of the page as denoted by the "arrow point." In FIG. 16B, the z-axis is directed into the page, as denoted by the "arrow tail."

In the embodiment of FIGS. 16A and 16B, spacer-wafer aperture 1604 is formed with two regions: an aperture region 1605(1) and an aperture region 1605(2). In an embodiment, aperture region 1605(1) is circular with diameter 730, as shown in FIG. 16A. Aperture region 1605(2) is formed with a width 731, as shown in FIG. 16B.

Figure 17A:
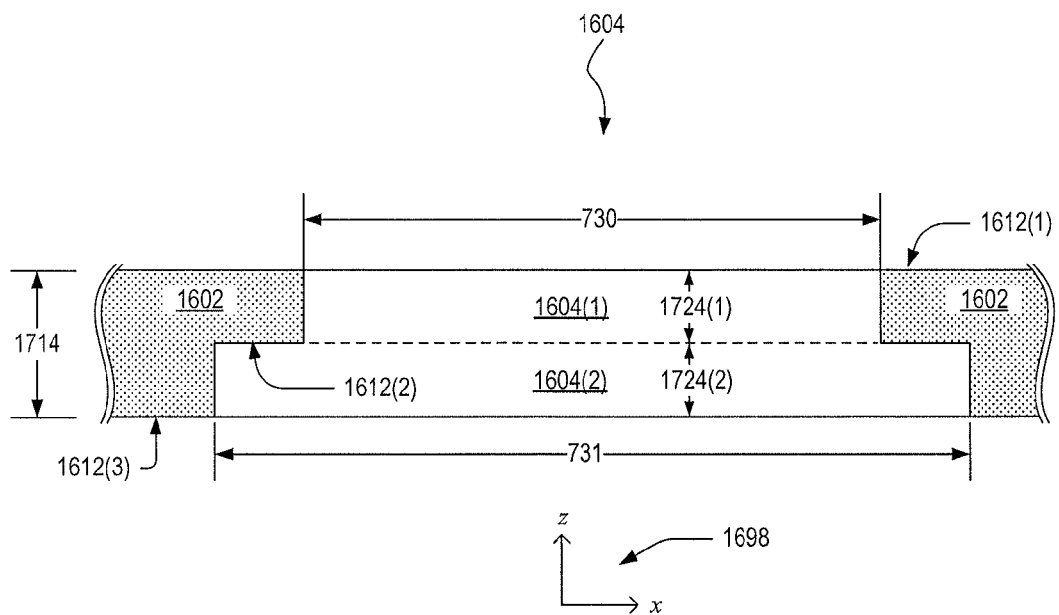
FIGS. 17A and 17B show cross-sectional views of the spacer wafer portion views shown in FIGS. 16A and 16B, respectively, in an embodiment.

FIG. 16A shows a top plan view of wafer-portion surface 1612(1). In this view aperture region 1605(1) of aperture 1604 is visible. FIG. 16B shows a bottom plan view of wafer-portion surface 1612(3). In this view aperture region 1605(2) is visible. FIG. 16B, shows middle wafer-portion surface 1612(2) with protrusions 1641. Protrusions 1641 do not extend completely through the spacer region 1602, which can be seen more clearly in FIG. 17A. FIG. 17A shows a cross-sectional view along cross-sectional line 1694A-1694A' of FIG. 16. Spacer region 1602 has a total thickness 1714 between wafer-portion surfaces 1612(1) and 1612(3). Aperture region 1605(1) has a thickness 1724(1) and diameter 730. Aperture region 1605(2) has a thickness 1724(2) and, in cross-section 1694A-1694A', width 731.

Figure 17B:
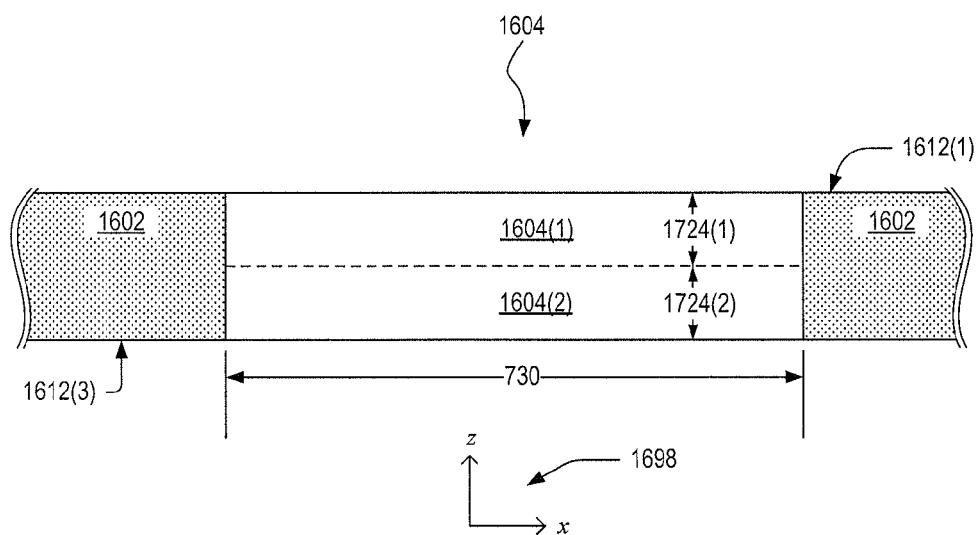

FIG. 17B shows a cross-sectional view along cross-sectional line 1694B-1694B' of FIG. 16. In the cross-sectional view of FIG. 17B, spacer-wafer aperture 1604 is shown with a width equal to diameter 730 through spacer region 1602's total thickness 1714. That is, in the cross-sectional view, width 1731 of aperture region 1605(2) is equal to diameter 730.

The perimeter of a concave spacer-wafer aperture in a plane through a spacer wafer circumscribes a convex shape with a shorter perimeter. For example, perimeter 1305 of concave spacer-wafer aperture 1304 circumscribes a circle 1306. In a plane through spacer wafer portion 1302, the length of perimeter 1305 exceeds the circumference of circumscribed circle 1306. Hence, the surface area of the spacer-wafer aperture 1304 aperture sidewall exceeds that of a convex spacer-wafer aperture with the cross-sectional shape of circumscribed circle 1306. Herein, the spacer-wafer aperture with the shape of the convex shape circumscribed by a concave spacer-wafer aperture is referred to as the "circumscribed convex aperture."

When used to fabricate suspended lenses, one example of which is suspended wafer-level optical element 1010, FIG. 10, the increased sidewall surface area of a concave spacer-wafer aperture increases lens-to-sidewall adhesion. That is, the sidewall surface area of a concave spacer-wafer aperture is much greater than that of the circumscribed convex aperture, which results in a greater lens-to-sidewall adhesion for the concave spacer-wafer aperture as compared to the circumscribed convex aperture.

Profiled Aperture Sidewall

Figure 19:
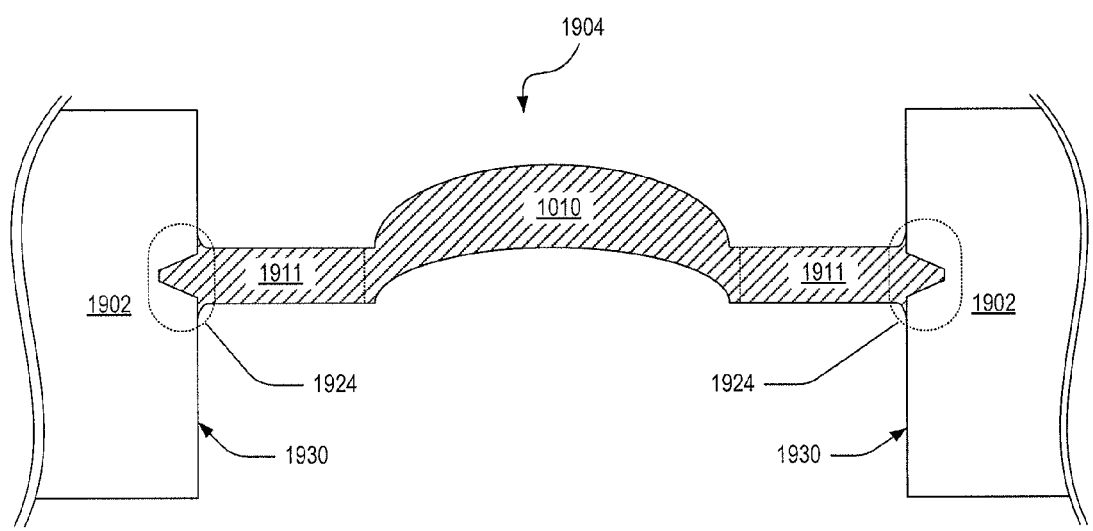
FIG. 19 shows a cross-sectional view of a wafer-level optical element formed within a concave spacer-wafer aperture with a concave sidewall profile, in an embodiment.
Figure 20:
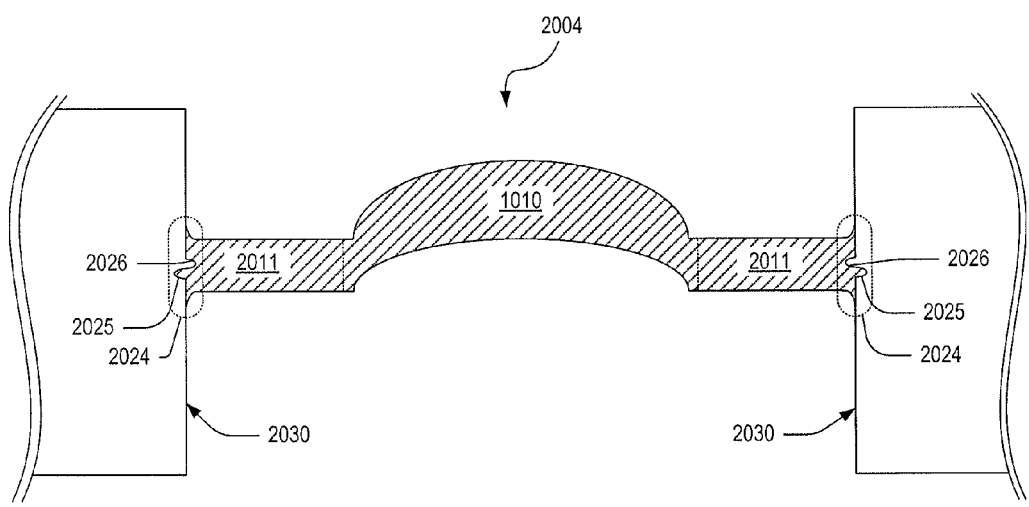
FIG. 20 shows a cross-sectional view of a wafer-level optical element formed within a concave spacer-wafer aperture with a sidewall profile that includes both a convex region and a concave region, in an embodiment.

In profiled aperture sidewall embodiments, adhesion of a suspended lens to the aperture sidewall is increased as compared to the prior art by adding a shaped profile of the aperture sidewall at least where the portion of the aperture sidewall supports a portion of the membrane of the optical element. Examples of profiled aperture sidewalls are shown in FIGS. 18-20, although other profiles may be utilized without departing from the scope herein.

As a comparison, FIGS. 8-9 show sidewalls 732, 733, and 734 of spacer-wafer aperture 704 as straight, vertical sidewalls that form right angles with adjacent spacer wafer surfaces 706 and 708. While these concave spacer-wafer aperture increase the sidewall surface area in contact with a suspended wafer-level optical element as compared to the prior art, adhesion may be further increased. By shaping the profile of the aperture sidewall the adhesion of a suspended wafer-level optical element to the aperture sidewall is increased.

Figure 18:
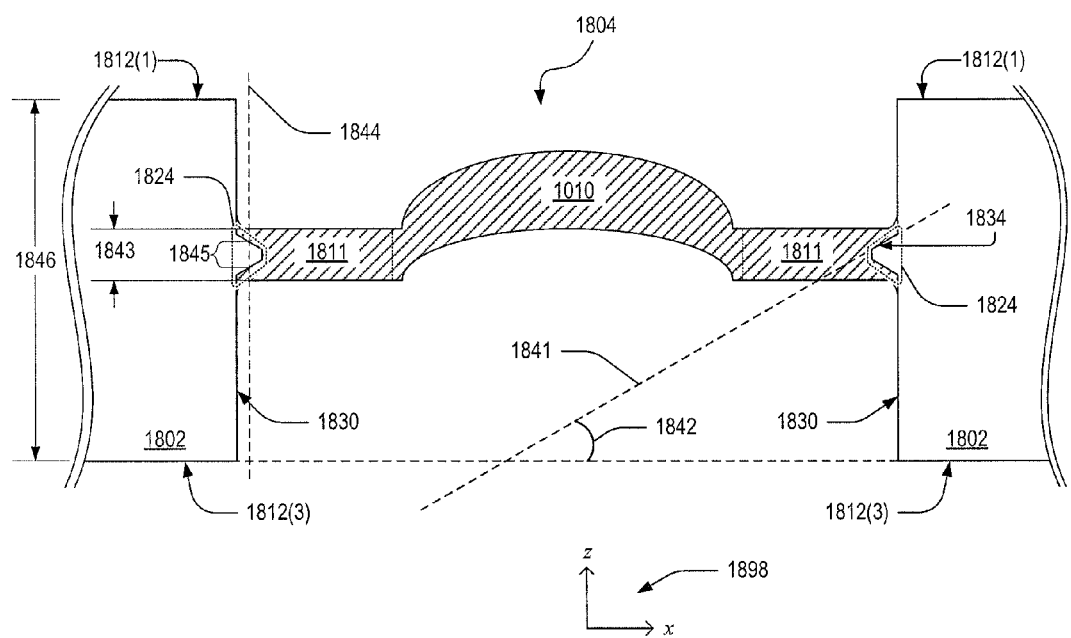
FIG. 18 shows a cross-sectional view of a wafer-level optical element formed within a concave spacer-wafer aperture with a convex sidewall profile, in an embodiment.

FIG. 18 shows wafer-level optical element 1010 suspended by a membrane 1811 and formed within a concave spacer-wafer aperture 1804. Spacer region 1802 may be utilized in a spacer wafer, one example of which is spacer wafer 600. Spacer wafer surfaces 1812(1) and 1812(3) are planar surfaces of spacer region 1802.

Spacer-wafer aperture 1804 has an aperture sidewall 1830 with an exemplary convex sidewall profile 1824. In one embodiment, the arc length of sidewall profile 1824 is more than 5% longer than membrane thickness 1843. Because the arc length of sidewall profile 1824 exceeds membrane thickness 1843, sidewall surface area of spacer-wafer aperture 1804 in contact with membrane 1811 is increased compared to that of a spacer-wafer aperture with a planar sidewall profile.

Line 1841, which extends from sidewall segment 1834, makes an oblique angle 1842 with the plane defined by spacer wafer surface 1812(3). Vertical line 1844 is perpendicular to the planes defined by spacer wafer surfaces 1812(1) and 1812(3) and intersects both membrane 1811 and sidewall profile 1824. Intersection length 1845 of vertical line 1844 with spacer region 1802 is less than the thickness 1846 of spacer region 1802. The shape of sidewall profile 1824 may vary without departing from the scope thereof.

FIG. 19 shows wafer-level optical element 1010 suspended by a membrane 1911 and formed within a concave spacer-wafer aperture 1904. Spacer-wafer aperture 1904 is defined by an aperture sidewall 1930 with an exemplary concave sidewall profile 1924. Spacer region 1902 may be utilized in a spacer wafer, for example, similar to spacer wafer 600.

FIG. 20 shows wafer-level optical element 1010 suspended by membrane 2011 and formed within a concave spacer-wafer aperture 2004. Spacer-wafer aperture 2004 has an aperture sidewall 2030 with an exemplary sidewall profile 2024. Sidewall profile 2024 contains both a concave section 2025 and a convex section 2026. Spacer region 2002 may be utilized in a spacer wafer, for example, similar to spacer wafer 600.

The shape of spacer-wafer apertures with shaped sidewalls, such as spacer-wafer apertures 1804, 1904, and 2004, may be one or both of a concave or a convex space-wafer aperture. Concave spacer-wafer apertures include, but are not limited to, spacer-wafer apertures 704, 1204, 1214, 1304, 1404, and 1504. In embodiments of any spacer-wafer aperture 1804, 1904, or 2004 with a concave spacer-wafer aperture, the surface area of spacer-wafer aperture sidewalls in contact with a suspended lens is increased in two planes. For example, as discussed in reference to concave spacer-wafer aperture 1304, the 32 triangular protrusions 1321 increase the spacer sidewall area in the plane of spacer region 1302. As discussed in reference to concave spacer-wafer aperture 1904, sidewall profile 1924 increases the spacer sidewall area in a plane perpendicular to spacer region 1902.

The concave and shaped sidewall profile spacer-wafer apertures disclosed herein are not meant to be limiting in any way, but are merely provided as examples of some possible concave spacer-wafer apertures and shaped sidewall profile spacer-wafer apertures that provide an overflow region that simultaneously increases adhesion of the wafer-level optical element with the aperture sidewall and provides concave shapes that increases the number of space-wafer apertures per wafer as compared to the convex aperture of the prior art. It will be understood that concave and shaped sidewall profile spacer-wafer apertures, may be formed with a wide variety of concave apertures shapes, shaped sidewall profiles shapes, or both concave apertures shapes and shaped sidewall profile shapes, without departing form the scope herein.

Combinations of Features

Features described above as well as those claimed below may be combined in various ways without departing from the scope hereof. For example, it will be appreciated that aspects of spacer wafers described herein may incorporate or swap features of another spacer wafers described herein. It will also be appreciated that aspects of wafer-level optical elements described herein may incorporate or swap features of another wafer-level optical element described herein. The following examples illustrate possible, non-limiting combinations of embodiments described above. It should be clear that many other changes and modifications may be made to the methods and device herein without departing from the spirit and scope of this invention:

(A1) Wafer-level optical elements, comprising (1) a spacer wafer formed with a plurality of apertures, each of the plurality of apertures having concave shape in a planar cross-section of the spacer wafer and including an overflow region intersecting the planar cross-section; and (2) a plurality of optical elements, each of the optical elements being formed of a cured flowable material within a respective one of the plurality of apertures; wherein a portion of the cured flowable material that forms each of the optical elements extends into its respective aperture's overflow region.

(A2) In the wafer-level optical elements denoted as (A1), the concave shape being a polygon.

(A3) In either of the wafer-level optical elements denoted as (A1) or (A2), the concave shape is a union of a plurality of geometric shapes.

(A4) In the wafer-level optical elements denoted as (A3), one of the plurality of geometric shapes is a convex polygon or a circle.

(A5) In any of the wafer-level optical elements denoted as (A1) through (A4), concave shape has one or both of reflection symmetry and rotational symmetry.

(A6) In any of the wafer-level optical elements denoted as (A1) through (A5), each optical element of the array of optical elements being formed with a membrane that surrounds and suspends its respective optical element within its respective aperture.

(A7) In any of the wafer-level optical elements denoted as (A1) through (A6), for each of the plurality of apertures, a line tangential to a sidewall profile of the aperture forms an oblique angle with a planar surface of the spacer wafer.

(A8) In any of the wafer-level optical elements denoted as (A1) through (A7), a line normal to a plane defined by one of two parallel spacer wafer surfaces intersects both a membrane and the spacer wafer.

(B1) A spacer wafer comprising at least one concave aperture formed with a concave shape in a planar cross-section of the spacer wafer and including an overflow region intersecting the planar cross-section.

(B2) In the spacer wafer denoted as (B1), the concave shape is a polygon.

(B3) In either of spacer wafers denoted as (B1) or (B2), the concave shape is a union of a plurality of geometric shapes.

(B4) In the spacer wafers denoted by (B3), one of the plurality of geometric shapes is selected from the group consisting of a convex polygon, a circle, and an ellipse.

(B5) In any of the spacer wafers denotes by (B1) through (B4), the concave shape is formed with one or both of reflection symmetry and rotational symmetry.

(B6) In any of the spacer wafers denotes by (B1) through (B5), a line tangential to a point on the concave aperture's profiled sidewall makes an oblique angle with respect to a planar surface of the spacer wafer.

(B7) In any of the spacer wafers denotes by (B1) through (B6), one of two parallel spacer wafer surfaces defines a plane and a line normal to the plane intersects the spacer wafer over a distance that is shorter than a thickness of the spacer wafer.

(B8) In any of the spacer wafers denotes by (B1) through (B7), the concave aperture is at least in part defined by a spacer-wafer aperture sidewall that is formed as a profiled aperture sidewall.

(B9) In any of the spacer wafers denotes by (B1) through (B8), the profiled aperture sidewall is formed with a shaped profile at least at a portion of the profiled aperture sidewall configured to support a membrane that suspends an optical element.

(B10) In any of the spacer wafers denotes by (B1) through (B9), the profiled aperture sidewall is formed with a concave profile.

(B11) In any of the spacer wafers denotes by (B1) through (B10), the profiled aperture sidewall is formed with a convex profile.

(B12) In any of the spacer wafers denotes by (B1) through (B11), the profiled aperture sidewall is formed with a combination of a concave profile and a convex profile.

What is claimed is:

1. Wafer-level optical elements, comprising:
   a spacer wafer formed from a slab having a bottom surface and a top surface opposite the bottom surface, the slab forming a plurality of apertures through the top and bottom surfaces such that each of the plurality of apertures is bounded by an interior surface of the slab, the interior surface having a concave shape in a cross section of the slab, between the top and bottom surfaces, such that each of the plurality of apertures has an overflow region bounded by a portion of the respective interior surface; and
   a plurality of optical elements, each formed of a cured flowable material within a respective one of the plurality of apertures, and including a first optical element within a first aperture of the plurality of apertures, the first optical element being formed with a membrane that surrounds and suspends the first optical element within the first aperture, the first aperture having a non-uniform extent and being bounded by a first interior surface of the slab that, in a second cross section of the slab orthogonal to the cross section and at a contact interface between the membrane and the first interior surface: (a) has a convex profile, and (b) forms a rim protruding into the aperture, to increase area of the contact interface so as to improve adhesion of the membrane to the first interior surface;
   wherein a portion of the cured flowable material of each one of the plurality of optical elements extends into the overflow region of the corresponding one of the plurality of apertures,
   the interior surface's concave shape having a perimeter, in the cross-section, wherein for at least one point on the perimeter at the overflow region and one point of the perimeter away from the overflow region, a shortest path therebetween is at least partially through a material forming the slab.

2. The wafer-level optical elements of claim 1, wherein the concave shape is a polygon.

3. The wafer-level optical elements of claim 1, wherein the concave shape is a union of a plurality of geometric shapes.

4. The wafer-level optical elements of claim 3, wherein one of the plurality of geometric shapes is a convex polygon or a circle.

5. The wafer-level optical elements of claim 1, wherein the concave shape has one or both of reflection symmetry and rotational symmetry.

6. The wafer-level optical elements of claim 1, in a second cross section of the slab orthogonal to the cross section, the first interior surface having a concave profile at the contact interface.

7. The wafer-level optical elements of claim 6, the first interior surface forming a recess in the slab at the contact interface.

8. The wafer-level optical elements of claim 1, the cross section being parallel to at least one of the top surface and the bottom surface.

9. Wafer-level optical elements comprising:
   a spacer wafer formed from a slab having a bottom surface and a top surface opposite the bottom surface, the slab forming a plurality of apertures through the top and bottom surfaces such that each of the plurality of apertures is bounded by an interior surface of the slab, the interior surface having a concave shape in a cross section of the slab, between the top and bottom surfaces, such that each of the plurality of apertures has an overflow region bounded by a portion of the respective interior surface; and a plurality of optical elements, each formed of a cured flowable material within a respective one of the plurality of apertures, and including a first optical element within a first aperture of the plurality of apertures, the first optical element being formed with a membrane that surrounds and suspends the first optical element within the first aperture, the first aperture having a non-uniform extent and being bounded by a first interior surface of the slab that, in a second cross section of the slab orthogonal to the cross section and at a contact interface between the membrane and the first interior surface: (a) has a profile having both a concave portion and a convex portion, and (b) forms both a rim protruding into the aperture and a recess in the slab, to increase area of the contact interface so as to improve adhesion of the membrane to the first interior surface;

wherein a portion of the cured flowable material of each one of the plurality of optical elements extends into the overflow region of the corresponding one of the plurality of apertures, the interior surface's concave shape having a perimeter, in the cross-section, wherein for at least one point on the perimeter at the overflow region and one point of the perimeter away from the overflow region, a shortest path therebetween is at least partially through a material forming the slab.

\* \* \* \* \*